United States Patent
Rohaninejad et al.

(10) Patent No.: US 12,059,813 B2
(45) Date of Patent: Aug. 13, 2024

(54) DETERMINE DEPTH WITH PIXEL-TO-PIXEL IMAGE CORRESPONDENCE FOR THREE-DIMENSIONAL COMPUTER VISION

(71) Applicant: Embodied Intelligence, Inc., Berkeley, CA (US)

(72) Inventors: Mostafa Rohaninejad, Saratoga, CA (US); Nikhil Mishra, Irvine, CA (US); Yu Xuan Liu, Sugar Lane, TX (US); Yan Duan, Berkeley, CA (US); Andrew Amir Vaziri, Lutherville, MD (US); Xi Chen, Berkeley, CA (US)

(73) Assignee: Embodied Intelligence, Inc., Berkeley, CA (US)

( * ) Notice: Subject to any disclaimer, the term of this patent is extended or adjusted under 35 U.S.C. 154(b) by 979 days.

(21) Appl. No.: 17/014,321

(22) Filed: Sep. 8, 2020

(65) Prior Publication Data
US 2021/0069908 A1 Mar. 11, 2021

Related U.S. Application Data

(60) Provisional application No. 62/897,286, filed on Sep. 7, 2019, provisional application No. 62/897,282, filed on Sep. 7, 2019.

(51) Int. Cl.
*B25J 9/16* (2006.01)
*G06T 7/593* (2017.01)

(52) U.S. Cl.
CPC ............. *B25J 9/1697* (2013.01); *B25J 9/161* (2013.01); *G06T 7/593* (2017.01); *G06T 2207/20084* (2013.01)

(58) Field of Classification Search
CPC ......... B25J 9/1697; B25J 9/161; G06T 7/593; G06T 2207/20084; G06T 2207/10024;
(Continued)

(56) References Cited

U.S. PATENT DOCUMENTS 10,906,188 B1 2/2021 Sun et al.
11,097,418 B2 8/2021 Nagarajan et al.
(Continued)

FOREIGN PATENT DOCUMENTS

WO 20190109336 6/2019

OTHER PUBLICATIONS

Andy Zeng, et al; Robotic Pick-and-Place of Novel Objects in Clutter with Multi-Affordance Grasping and Cross-Domain Image Matching; 2018 IEEE International Conference on Robotics and automation; May 1, 2018; 11 pages.
(Continued)

*Primary Examiner* — Christopher Wait

(57) ABSTRACT

Various embodiments of the present technology generally relate to robotic devices, computer-vision systems, and artificial intelligence. More specifically, some embodiments relate to a computer-vision system for robotic devices. In some implementations, a computer-vision is coupled to a robotic arm for picking items from a bin and perturbing items in a bin. A computer-vision system, in accordance with the present technology, may use at least two two-dimensional (2D) images to generate three-dimensional (3D) information about the bin and items in the bin. A method of training artificial neural networks to generate 3D information from 2D images includes obtaining ground truth data for a scene, obtaining at least two images of the scene, and providing the ground truth data and the at least two images to the artificial neural network configured to generate a depth map from the images based on the ground truth data.

17 Claims, 9 Drawing Sheets

(58) Field of Classification Search
CPC ........... G06T 2207/20081; G06T 2207/30164; G06N 3/045; G06N 3/08
See application file for complete search history.

(56) References Cited

U.S. PATENT DOCUMENTS

| | | |
|---|---|---|
| 2010/0092032 A1 | 4/2010 | Boca |
| 2011/0098859 A1 | 4/2011 | Irie et al. |
| 2011/0223001 A1 | 9/2011 | Martinez et al. |
| 2015/0039129 A1 | 2/2015 | Yasuda et al. |
| 2017/0136632 A1 | 5/2017 | Wagner et al. |
| 2019/0070734 A1 | 3/2019 | Wertenberger et al. |
| 2019/0071261 A1 | 3/2019 | Wertenberger et al. |
| 2019/0213481 A1* | 7/2019 | Godard ................. G06T 3/4007 |
| 2020/0013176 A1* | 1/2020 | Kang ..................... G06T 7/593 |
| 2020/0017317 A1 | 1/2020 | Yap et al. |
| 2020/0156266 A1 | 5/2020 | Curhan et al. |
| 2020/0206913 A1 | 7/2020 | Kaehler |
| 2020/0241574 A1 | 7/2020 | Lin et al. |
| 2021/0069904 A1 | 3/2021 | Duan et al. |
| 2021/0237266 A1 | 8/2021 | Kalashnikov et al. |
| 2022/0032463 A1 | 2/2022 | Schneider et al. |

OTHER PUBLICATIONS

International Preliminary Report on Patentability for PCT Application No. PCT/US2020/049702; mailed Mar. 17, 2022; 13 pages.
International Preliminary Report on Patentability for PCT Application No. PCT/US2020/049703; mailed Mar. 17, 2022; 12 pages.
International Preliminary Report on Patentability for PCT Application No. PCT/US2020/049704; mailed Mar. 17, 2022; 9 pages.
International Preliminary Report on Patentability for PCT Application No. PCT/US2020/049705; mailed Mar. 17, 2022; 10 pages.
International Search Report and Written Opinion for PCT/US2020/049702, filed Sep. 8, 2020, mailed Dec. 4, 2021; 19 pages.
International Search Report and Written Opinion for PCT/US2020/049703, filed Sep. 8, 2020, mailed Dec. 4, 2021; 17 pages.
International Search Report and Written Opinion for PCT/US2020/049705, filed Sep. 8, 2020, mailed Dec. 9, 2020; 18 pages.
Levine, Sergey, Learning Hand-Eye Coordination for Robotic Grasping with Deep Learning and Large-Scale Data Collection; ARVIX, vol. 1603.02199, Apr. 2, 2016; 12 pages.
Matthew Matl, et al.; "Learning Robotic Grasping Policies for Suction Cups and Parallel Jaws in Simulation", Aug. 16, 2019; https://www2.eecs.berkeley.edu/Pubs/TechRpts/2019/EECS-2019-119.pdf; 58 pages.
Renaud Detry et al: "Generalizing grasps across partly similar objects", Robotics and Automation (ICRA), 2012 IEEE International Conference ON, IEEE, May 14, 2012, 7 pages.
Shao, Quanquan, et al.; Suction Grasp Region Prediction Using Self-supervised Learning for Object Picking in Dense Clutter, 2019 IEEE 5th International Conference on Mechatronics System and Robots; May 3, 2019; 6 pages.
Shehan Caldera et al: Review of Deep Learning Methods in Robotic Grasp Detection, Multimodal Technologies and Interaction, vol. 2, No. 3, Sep. 7, 2018; 24 pages.
Alonso, Marcus; Current Research Trends in Robot Grasping and Bin Picking; International Joint Conference SOCO, Jun. 7, 2018; 10 pages.
Anas, Essa; Scene Disparity Estimation with Convolutional Neural Networks; SPIE, vol. 11059 Jun. 21, 2019; 9 pages.
International Search Report and Written Opinion for PCT/US2020/049704, filed Sep. 8, 2020; mailed Dec. 4, 2020; 16 pages.
Laga, Hamid; A Survey on Deep Learning Architectures for Image-based Depth Reconstruction; Jun. 14, 2019; 28 pages.
Olson, Elizabeth A.; Synthetic Data Generation for Deep Learning of Underwater Disparity Estimation, Oceans 2018 MTS/IEEE; Oct. 22, 2018; 6 pages.
Eitel, A., et al., "Learning to Singulate Objects using a Push Proposal Network", arXiv, Feb. 5, 2018 (Year: 2018).

\* cited by examiner

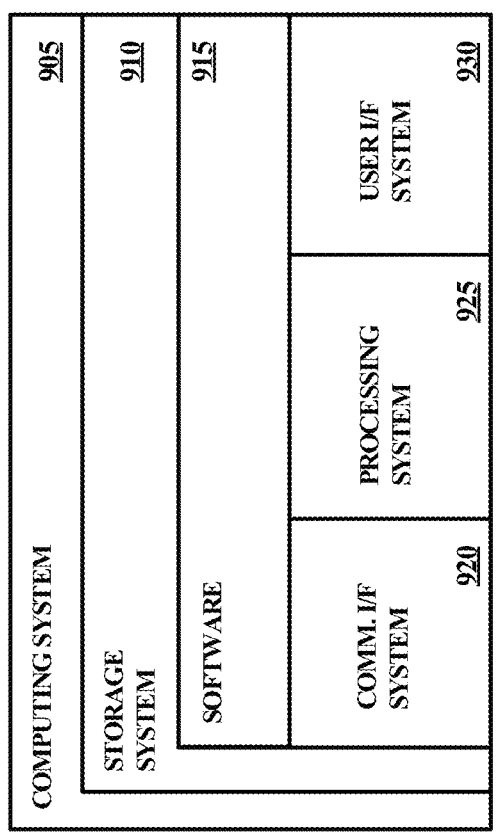

DETERMINE DEPTH WITH PIXEL-TO-PIXEL IMAGE CORRESPONDENCE FOR THREE-DIMENSIONAL COMPUTER VISION

CROSS-REFERENCE TO RELATED APPLICATIONS

This application is related to and claims priority to U.S. Provisional Patent Application No. 62/897,282, entitled "APPLICATION FOR PATENT," filed on Sep. 7, 2019 and to U.S. Provisional Patent Application No. 62/897,286, entitled "APPLICATION FOR PATENT," filed on Sep. 7, 2019, which are incorporated by reference herein in their entirety.

TECHNICAL FIELD

Various embodiments of the present technology generally relate to the field of robotic devices, computer-vision systems, and artificial intelligence. More specifically, embodiments include a computer-vision system for generating three-dimensional information from multiple two-dimensional images.

BACKGROUND

The field of robotics has grown dramatically in recent decades. Robots can be physical machines capable of carrying out certain computer programs to perform tasks. Robots and similar manipulator systems are commonly used in many commercial and industrial settings for precise or repetitive movements. Robots may be used to pick and place parts, weld, access locations too difficult or unsafe for humans to reach, and assist humans in many other applications.

In order for a machine to perform in a truly useful manner, it must be able to sense or perceive at least some aspects of what's going on around it and apply that knowledge to future decisions. Machines solely programmed to repeat a task or action, encounter issues or frequently get stuck, thus requiring human intervention and sometimes defeating the purpose of having a robot at all. Robots and machines are often guided with some level of computer vision. Computer vision allows a system to gain an understanding of its environment from digital images, videos, scans, and similar visual mechanisms. High-level vision systems must be used such that a machine can accurately acquire, process, and analyze data from the real world. Machine learning techniques allow a machine to receive input and generate output based on the input. Some machine learning techniques utilize deep artificial neural networks having one or more hidden layers for performing a series of calculations leading to the output.

Artificial neural networks, modeled loosely after the human brain, learn mapping functions from inputs to outputs and are designed to recognize patterns. A deep neural network comprises an input layer and an output layer, with one or more hidden layers in between. The layers are made up of nodes, in which computations take place. Various training methods are used to train an artificial neural network that uses optimization to continually update weights at the various nodes based on failures until a satisfactory model is achieved. Many types of deep neural networks currently exist and are used for a broad variety of applications and industries including computer vision, series forecasting, automated driving, performing medical procedures, aerospace, and many more. One advantage of deep artificial neural networks is their ability to learn by example, rather than needing to be specifically programmed to perform a task, especially when the tasks would require an impossible amount of programming to perform the operations they are used for today.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to robotic devices, computer-vision systems, and artificial intelligence. More specifically, some embodiments relate to a computer-vision system for a robotic device for picking items from a bin and perturbing items in a bin. The robotic device includes a picking element and a perturbation element. In some embodiments the robotic device is a robotic arm having the picking element and the perturbation element coupled to the robotic arm. The picking element may be used to pick up items in the bin. The perturbation element may be used to blow high-pressure air into the bin in order to perturb the contents of the bin. Perturbation may be performed when no picking options exist with reasonable probabilities of success. In some implementations, the robotic device may include or more computer-vision systems.

In some implementations the computer-vision system comprises two cameras that produce two-dimensional (2D) images. A 2D image of an area may be taken with each camera. The two images may then be correlated to generate three-dimensional (3D) information of the area. The robotic device herein may use the rendered images including the 3D information to identify distinct objects and geometries in the bin, determine picking strategies and locations, and determine perturbation strategies. Furthermore, a method of training the computer-vision system described herein is disclosed.

The vision system may be trained to generate 3D information from 2D images based on known, ground-truth data. In some implementations, a 3D mapping generated by a 3D camera is used to provide ground-truth data for training, in some embodiments. Computer-rendered simulations may also be used to provide ground-truth data for training.

In an embodiment, a computing apparatus comprises one or more computer-readable storage media, a processing system operatively coupled to the one or more computer-readable storage media, and program instructions, stored on the one or more computer-readable storage media, for training an artificial neural network. The program instructions, when read and executed by the processing system, direct the processing system to obtain ground truth data for a scene, wherein the ground truth data includes depth information for the scene, obtain at least two images of the scene, wherein each of the at least two images comprises a different view of the scene, and provide the ground truth data for the scene and the at least two images of the scene to the artificial neural network, wherein the artificial neural network is configured to generate a depth map from the at least two images based on the ground truth data.

In some embodiments, the scene is a scene in a computer simulated environment. The scene in the simulated environment may comprise one or more simulated objects for which the ground truth data includes depth information. The program instructions may further direct the processing system to generate the computer simulated environment. In an embodiment, each of the at least two images is a two-dimensional image. Furthermore, in an embodiment, to generate the depth map from the at least two images, the artificial neural network recursively updates parameters within the artificial neural network until a generated depth map matches the depth information in the ground truth data. To generate the depth map, the artificial neural network may be configured to identify which pixels in a first image of the at least two images correspond to pixels in a second image of the at least two images. In certain embodiments, the artificial neural network is a convolutional neural network.

In another embodiment, a method of training an artificial neural network to determine depth in images using computer simulation comprises obtaining ground truth data for a scene in a computer simulated environment, wherein the ground truth data includes depth information for the scene, obtaining at least two images of the scene, wherein each of the at least two images comprises a different view of the scene, and providing the ground truth data for the scene and the at least two images of the scene to the artificial neural network, wherein the artificial neural network is configured to generate a depth map from the at least two images based on the ground truth data.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 9 is an example of a computing system in which some embodiments of the present technology may be utilized.

Figure 1:
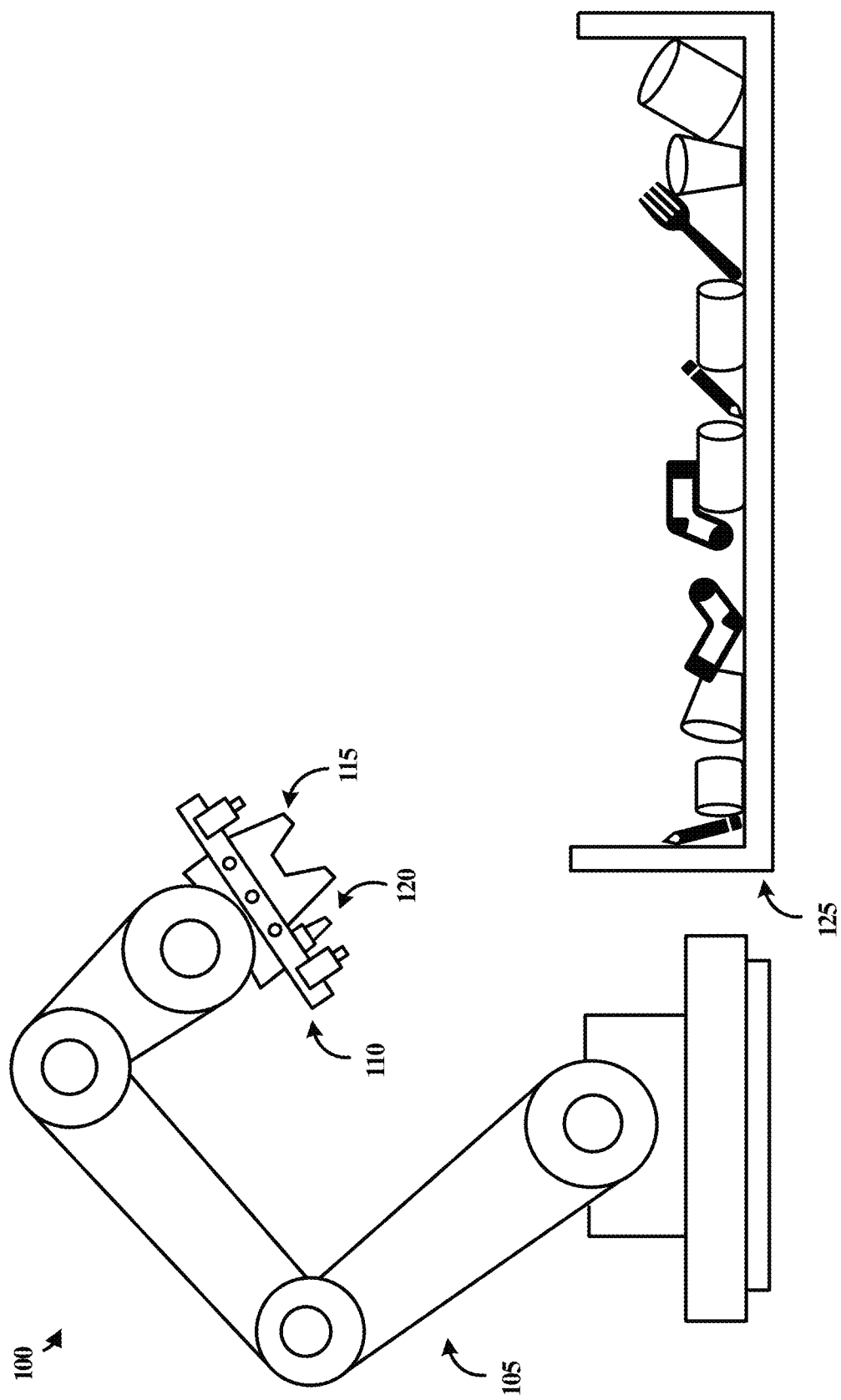
FIG. 1 illustrates an example of a robotic arm for picking and perturbing items in a bin in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Robots may be programmed to perform a variety of tasks, including grasping, picking, and moving. However, with traditional programming methods, a robot must be told exactly what to do for every single movement. While robots continue to grow and replace repetitive, laborious, unsafe, or otherwise undesirable human tasks, they continually fall short of performing tasks that cannot be directly coded into a program and require at least some level of intuition. An intelligent robot may be able to perceive and perform more like a human would through various learning techniques, rather than following pre-programmed trajectories.

An autonomous robot should be able to perceive and recognize the environment around it and process that information to come up with a way to perform a task. Thus, if a robot is picking items out of a bin, it should be able to sense the location and position of a specific item and apply that to determine how to pick up the item and move it to a desired location. A robot capable of sensing and applying that knowledge, even within highly repetitive settings, dramatically decreases the need for human intervention, manipulation, and assistance. Thus, human presence may no longer be required when items aren't perfectly stacked or when a robot gets stuck, as a few examples. If a robot regularly gets stuck, it may defeat the purpose of having a robot altogether, because humans may be required to frequently assist the robot.

Furthermore, robots already designed to complete industrial or commercial tasks, such as robots configured to pick items out a bin, face many issues. Even with the most advanced robotic arms and the ability to sense and make decisions, robots fall short of completing tasks such as picking every item out of a bin for various reasons. Challenges include awkwardly shaped items, difficult spots or locations to reach within a bin (such as corners), a variety of item materials and sizes, and similar challenges or unknowns. In order to accurately guide a robotic system, advanced computer vision systems are required. A computer vision system should be able to provide a system with high-quality visual information that can be used to understand depth, geometries, distinct shapes or items, material properties, and more. Furthermore, each gripper presently used by robotic arms has some weaknesses in which it may not be able to grip certain items in certain situations. The infinite number of possible arrangements render it nearly impossible to guarantee that a robot would be able to pick up every single item in a bin every time. Based on the variety of challenges faced by present day robots, a new technique for picking and perturbing items in a bin with a robotic device is disclosed.

Thus, various embodiments of the present invention generally relate to a robot for performing tasks in addition to the systems and methods that control and train the robot. More specifically, some embodiments include a robot for intelligently perturbing and picking items out of a bin. A robot for picking elements out of a bin, in accordance with some embodiments of the technology, comprises two effectors: a picker element and a perturbation element. As previously mentioned, advanced machines for picking items from a bin, such as a robotic arm, can be very proficient at picking up most items, but fall short of being able to pick every item from a bin, in every position, every single time. This may be due, in part, to physical constraints or limitations in the design of a machine that cause certain angles and locations to be difficult to access. These limitations are also due to the wide variety of materials and positions an item may be in. Thus, in addition to a picker element that can pick items out of a bin and move them to a new location, a perturbation element is included on the robotic device. In certain embodiments, the robotic device is a robotic arm having a suction-based picking element and high-pressure air-based perturbation element.

The perturbation element, in accordance with the present technology, perturbs a present arrangement of items within a bin. The robotic device may include one or more mechanisms of perturbation. In certain implementations, the perturbation element is a compressed air valve. The robot may use the compressed air valve to blow high-pressure air into a bin in order to rearrange one or more items in the bin. By perturbing the items in the bin, the items may move such that they can then be picked up from a different position. Perturbation may occur in a general or targeted manner. For example, in a general perturbation strategy, the robot may blow compressed air into the bin continuously, following a trajectory around the edge of the bin. In this manner, most or all of the items in the bin may move as a result of being blown around by the compressed air. After the perturbation is complete, the robot may then re-assess the arrangement of items in the bin and re-attempt to pick up an item. In other implementations, the perturbation element may be used without being coupled to a picking element. In such cases, the perturbation element may be useful for perturbing objects for purposes other than picking.

Alternatively, the robot may perturb an item in a bin in a targeted manner. In a targeted perturbation strategy, the robot may blow compressed air, in a discrete or continuous manner, or physically touch an item, in order to perturb the specific item in a specific or non-specific way. For example, if a marker is standing upright in the corner of a bin, many types of picking elements may struggle to grab the marker due to its position. Thus, a perturbation element could knock the marker down onto its side to make it easier to pick up. If the perturbation element successfully knocks down the marker, it can then re-try to pick up the marker. If the perturbation element fails to knock down the marker, because it could only push it towards the corner, for example, the perturbation element might try an alternative approach. In a different attempt, the perturbation element may blow compressed air behind the marker into the back corner to get the marker to fall down or move away from the corner. If the perturbation element succeeds at moving the marker, it could then re-try to pick up the marker. If the perturbation element fails to move the marker, it may try another perturbation method. For example, in yet another perturbation attempt, the perturbation element may take a general, non-targeted approach wherein it continuously blows air around the inner perimeter of the bin. In this way, the perturbation element may effectively disturb the position of the marker through the general perturbation, and subsequently re-try to pick up the marker.

The machine may continue to attempt perturbing and picking up the marker in this manner until it succeeds. The perturbation techniques and strategies may exclude any mentioned approaches and methods, or may include additional approaches and methods, such as stirring, as one example. The order of operations in the previous example are presented solely for the purpose of explanation and are not intended to limit the actual series of operations, limit the number of steps, or limit the types of perturbation approaches. The actual order of operations may vary, including but not limited to having fewer steps, having additional steps, having additional methods, having different orders of steps and methods, or similar variations thereof.

The picking element may comprise one or more different types of picking mechanisms including but not limited to a pinching mechanism, a gripping mechanism, a grabbing mechanism, a robotic hand, a parallel plate mechanism, a suction or vacuum mechanism, a magnet or a magnetic mechanism, or similar mechanisms capable of picking items. In an exemplary embodiment of the present technology, a robotic arm comprises a suction mechanism for picking items from a bin (i.e., the picking element) and a compressed air valve for perturbing elements in the bin (i.e., the perturbation element). Although the suction mechanism can pick up objects of many different shapes, sizes, orientations, and materials, it may still not be able to pick up certain items due to positional limitations, material limitations, and similar item or device-related limitations. Thus, the perturbation element may reposition objects, via compressed air or touch, such that picking can be achieved.

For example, if the picking device (i.e., the robotic arm and suction element) needs to pick up a pair of socks from a bin, it may not be able to directly pick the socks because their porous fabric does not enable a vacuum to form between them and the suction element. However, the socks may include a tag attached to them that the picker could successfully grab with the suction element. Thus, if the tag is showing, the machine may recognize that it should attempt to pick up the socks by their tag and proceed to do so. If the attempt fails, or if the tag is not visible to the machine, the machine may initiate a perturbation sequence. For example, the machine may recognize, due to the position of the socks, that blowing a targeted pulse of compressed air towards the socks is most likely to successfully perturb the socks. The machine would therefore attempt the determined perturbation. After the perturbation attempt, the machine reassesses the bin for items that it might be able to successfully pick up. If the tag of the socks is showing, the machine may re-try to pick up the socks using the suction element to grab the tag. If the attempt is successful, the machine can move on to another item with the next highest probably of picking success. If the attempt is unsuccessful, the machine may move on to another item in the meantime or re-initiate a perturbation sequence. The perturbation sequence may be a similar technique to the first attempt, or may be a different technique, such as a general bin perturbation.

In some embodiments, the machine may follow a predetermined series of steps when assessing bin arrangement, determining which items to attempt to pick, determining likelihood of success, determining how to pick an item, determining when and how to perturb an item or items, or additional steps. In alternative embodiments, the machine may make decisions on the most appropriate series of steps for each situation, rendering each sequence subject to be partially or entirely different from a previous sequence or any exemplary sequences provided herein.

The technology described herein should not be limited to picking and perturbing items in only bins. The present technology has many applications in which a mechanism for picking and perturbating items or objects is useful. In some examples, the robotic device and computer-vision system described herein may be used to pick and perturb items within any region accessible to the robotic device such as flat surfaces, conveyor belts, piles of items, and other locations or scenarios. The region may comprise walls or barriers, similar to a bin, or may not comprise any defined boundaries. In some examples, the system herein may be used to pick and perturb items in an area similar to a bin such as a tub, a box, a bucket, a crate, a bed, or similar regions to those listed. A bin is used in many examples included herein for purposes of explanation and clarity, but the present technology is useful for many other types of regions and those uses are anticipated.

FIG. 1 illustrates an example of commercial environment 100 having a robotic arm for picking and perturbing items in a bin in accordance with some embodiments of the present technology. FIG. 1 includes robotic arm 105 and bin 125. Robotic arm comprises vision system 110, picking element 115, and perturbation element 120. Bin 125 is holding a variety of items that may be found in a warehouse, commercial setting, or industrial setting including pencils, cans, cups, socks, and utensils. Many other types of items may be in a bin for picking in accordance with the present disclosure. In the present example, robotic arm 105 is a six-degree-of-freedom (6DOF) robotic arm. Picking element 115 and perturbation element 120 are designed for picking all the items out of bin 125 and moving them to a different location. In certain implementations, the robotic arm may pick each item one at a time and sort the items into their respective, sorted locations.

Picking element 115 may comprise one or more picking mechanisms for grabbing items in bin 125. Picking mechanisms may include a suction mechanism, a gripping mechanism, a robotic hand, a pinching mechanism, a magnet, or any other picking mechanism that may be used in accordance with the present disclosure. In some examples, picking element 115 may additionally be used for perturbation, such as poking, touching, stirring, or otherwise moving any items in bin 125, as just a few examples. Robotic arm 105 may move and position picking element 115 such that it is able to pick up an item in bin 125. In certain embodiments, determining which item to pick up and how to pick it up is determined using a deep artificial neural network. The deep neural network (DNN) may be trained to guide item pick-up and determine which items have the greatest probabilities of pick-up success. In other embodiments, picking may be guided by a program that does not use a DNN for decision making.

Perturbation element 120, in the present example, is a pneumatic air valve connected to a pneumatic air supply, wherein the pneumatic air valve blows compressed air into bin 125 in certain situations. Perturbation element 120 may be used in situations where the DNN or another model determines that there is low probability that it will be able to pick up any items in bin 125 with picking element 115 as they are presently arranged. In some examples, the robotic arm may have already tried and failed to pick every visible item in the bin, and therefore decides to initiate a perturbation sequence. Perturbation may be conducted in a general or targeted manner as well as in a continuous or discrete manner. During perturbation, perturbation element 120 may disturb the present arrangement of items in bin 125 by blowing compressed air into bin 125. Compressed air may be blown into a specific spot of bin 125 in an attempt to move a specific item. Compressed air may otherwise be blown into the entire bin in a generic pattern, at a random spot in the bin, or in any other manner that may disturb the present arrangement of items.

Vision system 110 may comprise any number of visual instruments, such as cameras or scanners, in order to guide motion, picking, and perturbation. Vision system 110 receives visual information and provides it to a computing system for analysis. Based on the visual information provided by vision system 110, the system can guide motions and actions taken by robotic arm 105. Vision system 110 may provide information that can be used to decipher geometries, material properties, distinct items, bin boundaries, and other visual information related to picking items from a bin. Based on this information, the system may decide which item to attempt to pick up and can then use vision system 110 to guide robotic arm 105 to the item. Vision system 110 may also be used to decide that items in the bin should be perturbed in order to provide a higher probability of picking success. In the present example, vision system 110 is mounted to robotic arm 105. However, vision system 110 may be in any other location that it can properly view bin 125 from, either on or off of robotic arm 105. In some examples, visions system 110 may be mounted to a stationary component from which it can view bin 125, separate from the robotic device.

Figure 2:
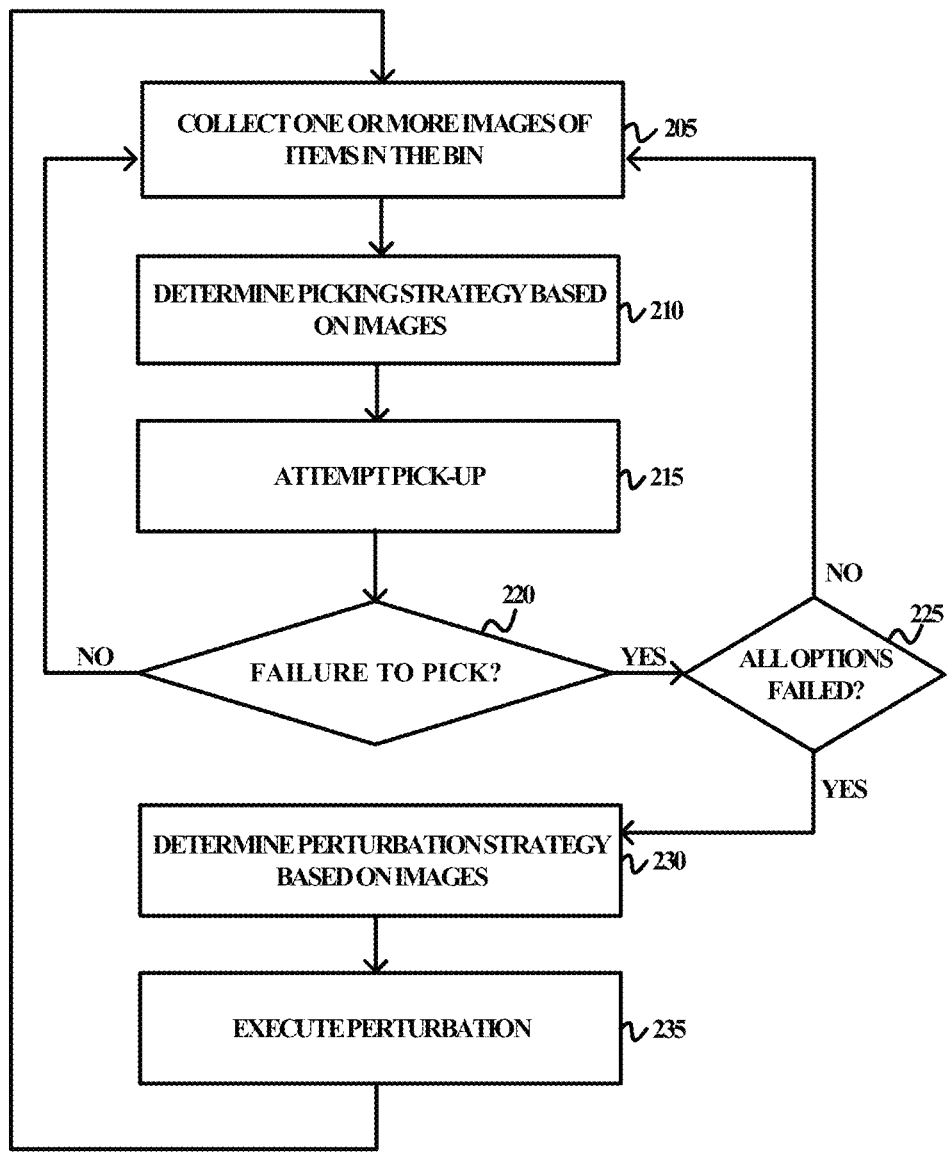
FIG. 2 is a flow chart illustrating an exemplary series of operations for picking and perturbing items in a bin in accordance with some embodiments of the present technology.

FIG. 2 is a flowchart illustrating an exemplary set of operations that a machine may use to pick items from a bin in accordance with some embodiments of the present technology. In step 205, the machine collects one or more images of the contents of the bin. The machine may use visual sensing, imaging, scanning, or any other type of computer-based vision helpful for identifying items in the bin. In some examples, the machine takes one or more images using at least one camera to see the arrangement of items in the bin. The machine may use a 3D camera, an RGB camera, a similar camera, or variations or combinations thereof to image the contents of the bin. In the present example, the machine comprises a 6 DOF robotic arm having a vacuum element and a compressed air valve.

In step 210, the machine uses data collected in step 205 to determine a picking strategy. The picking strategy may be chosen based on the number of items in the bin, material properties of items in the bin, the arrangement of items in the bin, or similar qualities or combinations thereof. Based on these qualities, the probability of success for picking up various items and a picking strategy for each item can be determined. The picking strategy may include the order of items to be picked up, how each item is picked up, where on each of the items to pick them up from, direction or orientation from which to pick them up, or variations and combinations thereof. The proposed picking strategy may include any movement or position within the 6 DOF range of the robotic device.

Once a picking strategy has been determined, the machine attempts to pick up an item in step 215. The attempt is based on the picking strategy determined in step 210. If the robotic arm successfully picks the item, it may move the item to another location according to the needs of the scenario. The machine may then attempt to pick the next item, in some examples. In step 220, the machine determines if it failed to pick up the item. The machine may recognize that an item was not picked based on failure to create a vacuum from not picking the item at all, from loss of vacuum if the item was dropped, or another factor based on the picking method being used. If the machine determines that the item was not successfully picked up and moved, it may then determine if all options in the bin have been exhausted. If there are remaining viable options for pick up, the machine may return to step 215 and attempt to pick up a different item. If there are no more good options to try to pick up, the machine may move to step 230. After determining if the machine failed to pick up the item or not, information related to the attempt may be stored in memory to be used in future decision making or attempts. Information may be stored based on a failed attempt or a successful attempt. The information may then be accessible for use on the next attempt or may be used to reason about what action to perform next, in some examples.

In step 230, the machine determines a perturbation strategy based on images. The images may be the same images used in step 205 or may be a new set of images collected specifically for the perturbation analysis. The data may similarly be collected via a camera or similar sensing or imaging methods as previously discussed. Based on the images, the machine may use information related to the relative positions of items, the number of items, the material properties of items, or other qualities relevant to perturbation methods and combinations thereof. The machine may pick a perturbation strategy such as a targeted or general strategy, continuous or discrete, physical touch or compressed air, and similar options relevant to perturbation. The machine may use its robotic arm to blow air into the bin, stir the bin, knock items down, touch items, or use similar disturbance or perturbation methods or combinations thereof. After determining the perturbation strategy that the machine will use, the machine executes the perturbation strategy in step 235. The machine may subsequently return to step 205 after perturbation, in some examples. After perturbing the arrangement in the bin, information related to the attempt may be stored in memory to be used in future perturbations. The information may then be accessible for use on the next attempt or for future decision making. For example, the perturbation strategy may be stored such that it can correlate failure or success in the next round of picking with the perturbation strategy or may be used to reason about what action to take next.

In some scenarios, choosing a picking or perturbation strategy is based on pre-defined protocols. In this manner, the machine may be able to try a series of different methods until it is successful. The pre-determined protocols may be used based on the various inputs such as images. In these approaches, a general set of logic controls may be used to determine what strategy to try next. However, in some embodiments choosing a picking or perturbation strategy may be based on machine learning techniques. The machine learning techniques may be implemented within numerous parts of the robotic picking and robotic perturbation process. Deep neural nets may be implemented and trained for the purposes of determining when, where, what, and how the effectors (i.e., the picker element and the perturbation element) pick and perturb items. Using deep neural nets for the purposes of generating effector logic may allow the machine to adapt to any situation, arrangement, item type, and other scenarios by learning from previous failures and continually improving or refining the techniques used. Reinforcement learning, imitation learning, supervised learning, un-supervised learning, and any other types of machine learning or combinations thereof may be used for operating the machines and methods described herein.

Figure 3:
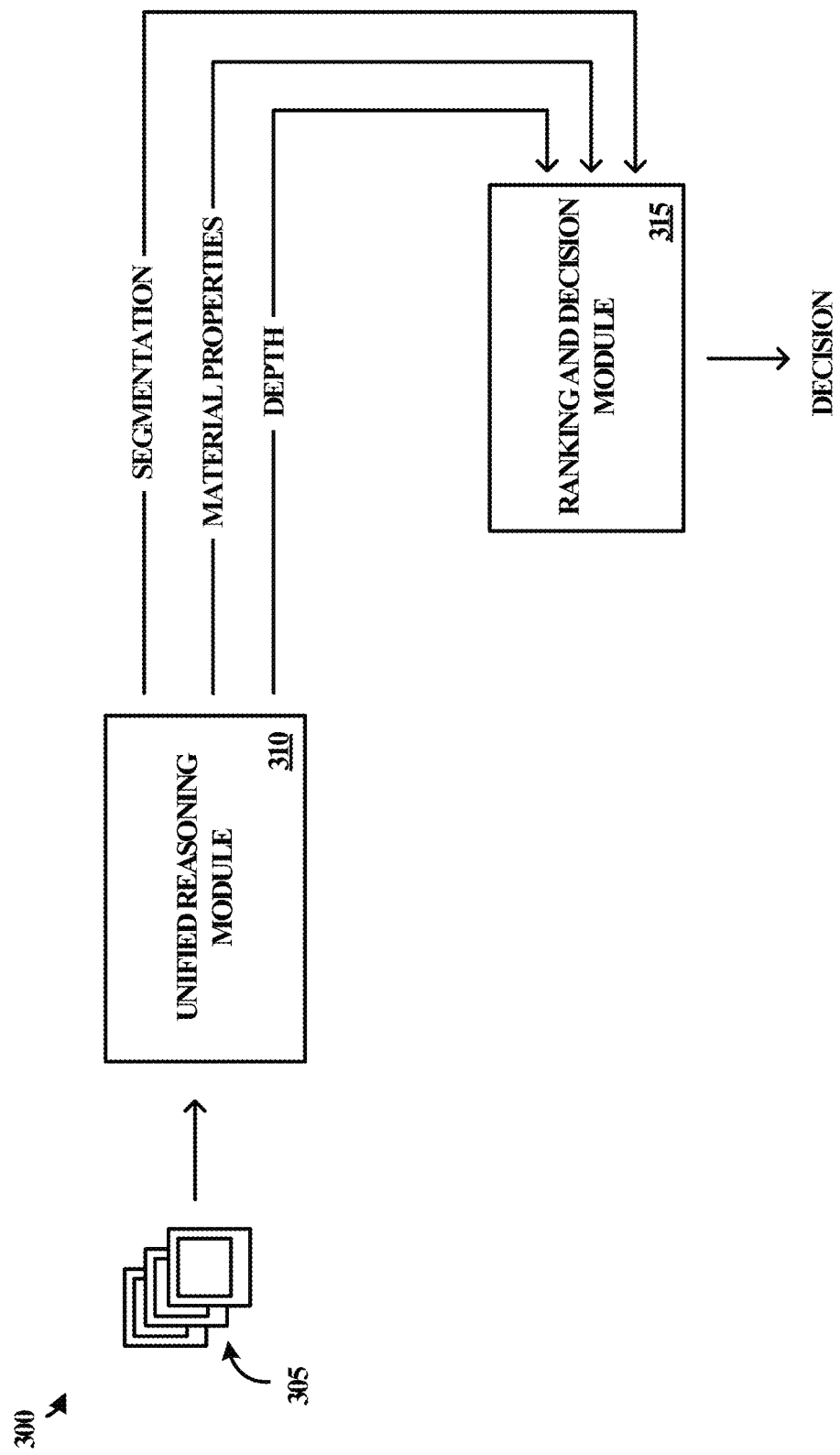
FIG. 3 illustrates an image processing and reasoning environment for guiding a robot to pick up items from a bin in accordance with some embodiments of the present technology.

FIG. 3 illustrates an example flow within environment 300 in accordance with some embodiments of the present technology. In the present example, images 305 are used an input to and processed in unified reasoning module 310. Images 305 may be one or more images taken by an imaging or computer-vision system. In the present example, the picking and perturbation machine comprises a 6 DOF robotic arm. Coupled to the 6 DOF robotic arm is at least one camera, a suction valve (i.e., vacuum), and a compressed air valve. Images 305, in the present example, are collected by at least one camera coupled to the 6 DOF robotic arm, as is exemplified in FIG. 1. The images are processed in unified reasoning module 310. In some examples, unified reasoning model comprises at least one deep neural network trained for analyzing images. In the present example, image analysis includes performing segmentation, deciphering material properties, and determining depth. However, fewer or additional image analysis processes may be included in unified reasoning module 310 and are anticipated.

Segmentation includes deciphering distinct objects in images 305. Segmentation may include a variety of sub-processes to assist in finding distinct objects. Understanding material properties of each distinct object may then be important for understanding the limitations regarding how an item can be picked up. Understanding the depth of each object may assist in segmentation and may also assist when it is time to approach and pick up an item with the robotic device. Although segmentation, material properties, and depth are illustrated as individual outputs for the purpose of illustration, the outputs of unified reasoning module 310 may be a single, unified model comprising information related to the various types of data discussed or a variation or combination of the outputted data.

The output or outputs of unified reasoning module 310 serves as input to ranking and decision module 315. Ranking and decision module 315 may process the unified model provided by unified reasoning module 310 to produce a ranking of potential pick-up points. The ranking may include a ranking of items according to probability of successful pick-up and a ranking of points on one item or multiple items according to the probabilities of successful pick-up. In some examples, the different types of rankings may be included in the same list. The ranking model may include one or more deep neural nets that have been trained for ranking the probability of success in pick-up options. The ranking model may provide a set of proposed pick-up strategies including grasps and orientations within the range of the 6 DOF robotic arm. Based on the ranking model and proposed pick-up strategies, ranking and decision module 315 decides what to try. Ranking and decision module 315 may then output the decision. Based on the decision, the robotic arm attempts to pick up the specified object at the specified point.

Figure 4:
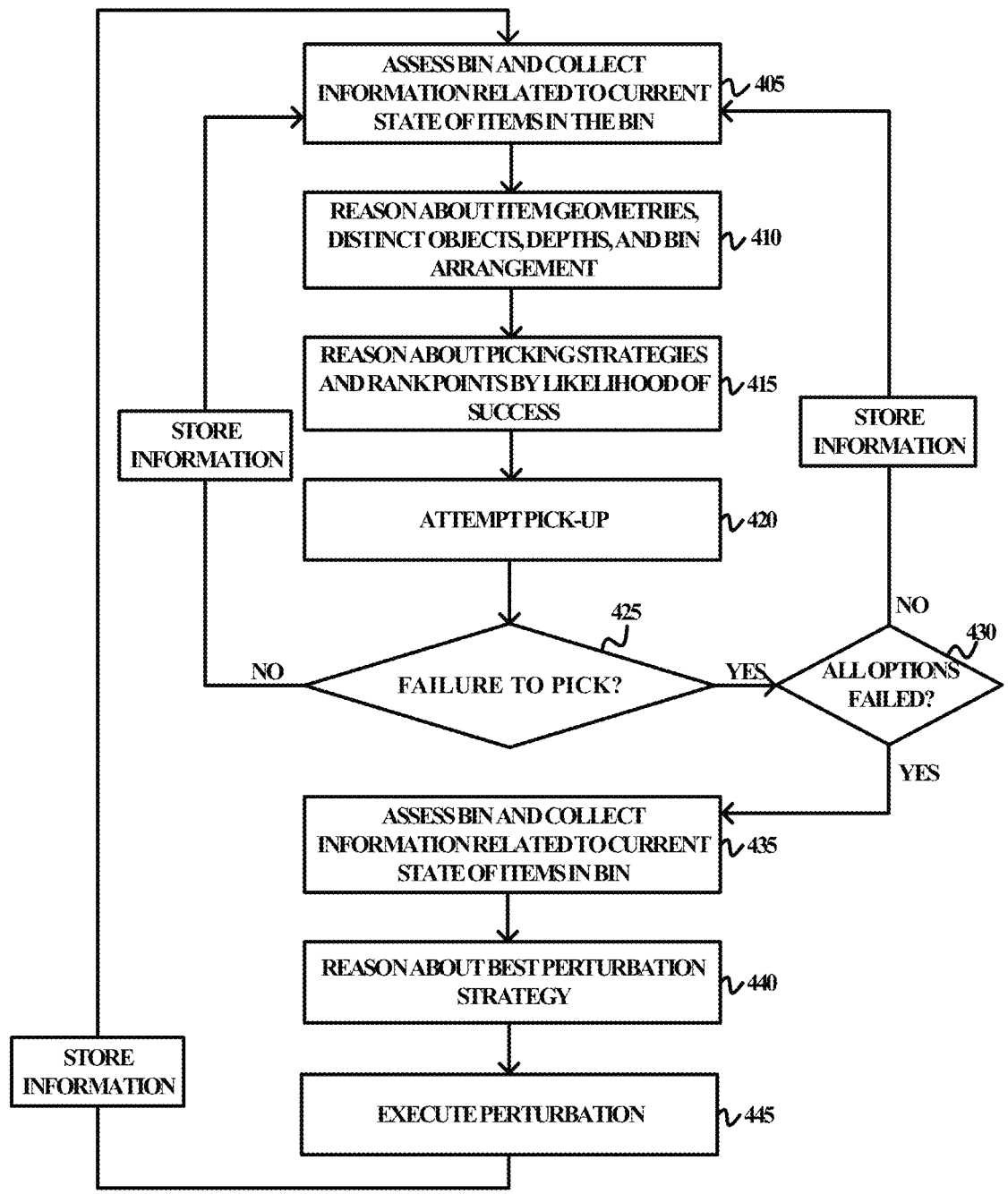
FIG. 4 is a flow chart illustrating an exemplary series of operations for decision-making, picking items, and perturbing items in accordance with some embodiments of the present technology.

FIG. 4 is a flowchart illustrating an exemplary set of operations that a machine may use to pick items from a bin in accordance with some embodiments of the present technology. In step 405, the machine assesses the bin to collect information on the current state of items in the bin. The machine may use visual sensing, imaging, or any other type of sensing helpful for identifying items in the bin. In some examples, the machine takes one or more images using at least one camera to see the arrangement of items in the bin. The machine may use a 3D camera, a red-green-blue (RGB) camera, or a similar camera or combinations thereof to image the contents of the bin.

In step 410, the machine uses data collected in step 405 to reason about the situation in the bin. In some embodiments, this reasoning includes segmentation. Via segmentation, the machine may reason about or identify distinct objects within the bin. In some examples, segmentation is implemented within a machine learning structure, such as a deep neural net, wherein the machine may learn how to effectively identify distinct objects and subsequently improve at segmentation. After training and over time, the machine may learn from previous failures to continually improve at segmenting out distinct items. During step 410, the machine may further reason about the geometry of distinct objects, the depth or distance of objects with respect to the machine or bin, the material properties of distinct objects, or similar qualities and features including combinations thereof. Similar to segmentation, the machine may comprise an intelligent learning structure that may learn how to effectively reason about the qualities and features mentioned and subsequently improve at identifying them.

In step 415, the machine reasons about the items and points with the highest probability of picking success. Reasoning performed by the machine may be based on knowledge from previous picking experience or attempts. The machine may look for items and for places on the items that have known or learned elements that have historically led to success. For example, referring back to the example of the socks, the machine may search for a flat tag to grab the socks by because it knows from previous experience that the machine is likely to succeed when picking something up by a flat surface. On a given item, the machine may pick a variety of points and reason about which points are better than others for picking up the items up. In certain embodiments, the machine uses a ranking model for both objects and places. Using the ranking model, the machine can rank the items in view by the probability that the machine could successfully pick up each item. Similarly, the machine may rank points on various objects according to the probability of a successful pick-up at that point. Based on the rankings, the machine may produce a set of proposed grasps and orientations to attempt to pick the items. The reasoning performed in step 415 may, similar to step 410, be implemented in a machine learning structure. Using a trained deep neural net, the machine can learn from previous failures and continually improve at identifying and choosing picking strategies based on the information provided. The grasps and orientations proposed by the machine may be within the full spectrum of motion for the arm, which, in some embodiments, may be a full 6 DOF robotic arm comprising a suction-based picking mechanism. As such, a deep neural net may be an effective solution to sorting through the infinite number of possible picking strategies.

In step 420, the machine attempts to pick up an item by the highest ranked (i.e., most promising) point in the bin and move the item to a new location. In some examples, the new location may be a different bin. If the machine is being used to sort items from a bin, the machine may move the item into its corresponding, sorted bin. If the machine successfully picks up the item and moves it to its new location, the machine may continue down the rankings and attempt to pick up an item by the next highest ranked point in the bin.

In step 425, the machine determines if it failed to pick up the item. The machine may be able to sense pick-up failure if it dropped the item or the pick never occurred by determining that a vacuum never formed between the suction element and an item, in the example of the suction-based picking element. If the machine failed to pick up the item, it moves to step 430 to determine if there are more options in the bin to attempt. If there are more options, the machine may attempt to pick up an item by the next highest ranked point. The next highest ranked point may be on the same item or a different item. If every option in the bin has failed (i.e., each item point in the rankings has been attempted), the machine moves on to perturbation. After determining if the machine failed to pick up the item or not, information may be stored related to the last attempt. The information may be then be implemented and used in future attempts.

In step 435, the machine assesses the bin to collect information on the current state of items in the bin. This data may be collected via a camera or similar sensing or imaging method as previously discussed. In step 440, the machine reasons on the best way to perturb the items or a single item in the bin. The machine may pick a perturbation strategy such as targeted or general, continuous or discrete, physical touch or compressed air, and similar options for perturbation. The machine may use its robotic arm to blow air into the bin, stir the bin, knock items down, touch items, or similar perturbation methods, variations, or combinations thereof. Which approach the machine chooses to attempt first may vary depending on the present scenario, previous learning experiences, pre-determined order, or similar protocols. The approach may be based, at least in part, on how many items are left in the bin. Similar to reasoning through steps previously discussed, the reasoning about perturbation strategies may be implemented within a machine learning structure. Using a trained deep neural net, the machine may be able to effectively determine a perturbation strategy with the highest likelihood of success based on what it has learned from previous perturbation failures and continually improve its ability to pick perturbation strategies over time.

Finally, in step 445, the machine executes the determined perturbation strategy. In some scenarios, the machine may then return to step 405 and re-assess the present situation within the bin. Alternatively, the machine may return to a different step, such as re-assessing the bin or a specific item in step 435 and trying a different perturbation strategy. After executing the perturbation strategy, information may be stored about the perturbation strategy and executed method. This information may then be implemented and used in future perturbation methods, in some examples.

Several methods of determining depth, including three-dimensional (3D) imaging, exist but fall short of being able to accurately determine depth in every scenario. 3D cameras often provide incorrect results in difficult imaging scenarios.

These scenarios include trying to image reflective materials, translucent materials, low-texture materials, repeated patterns, and solids, as just a few examples.

Figure 5:
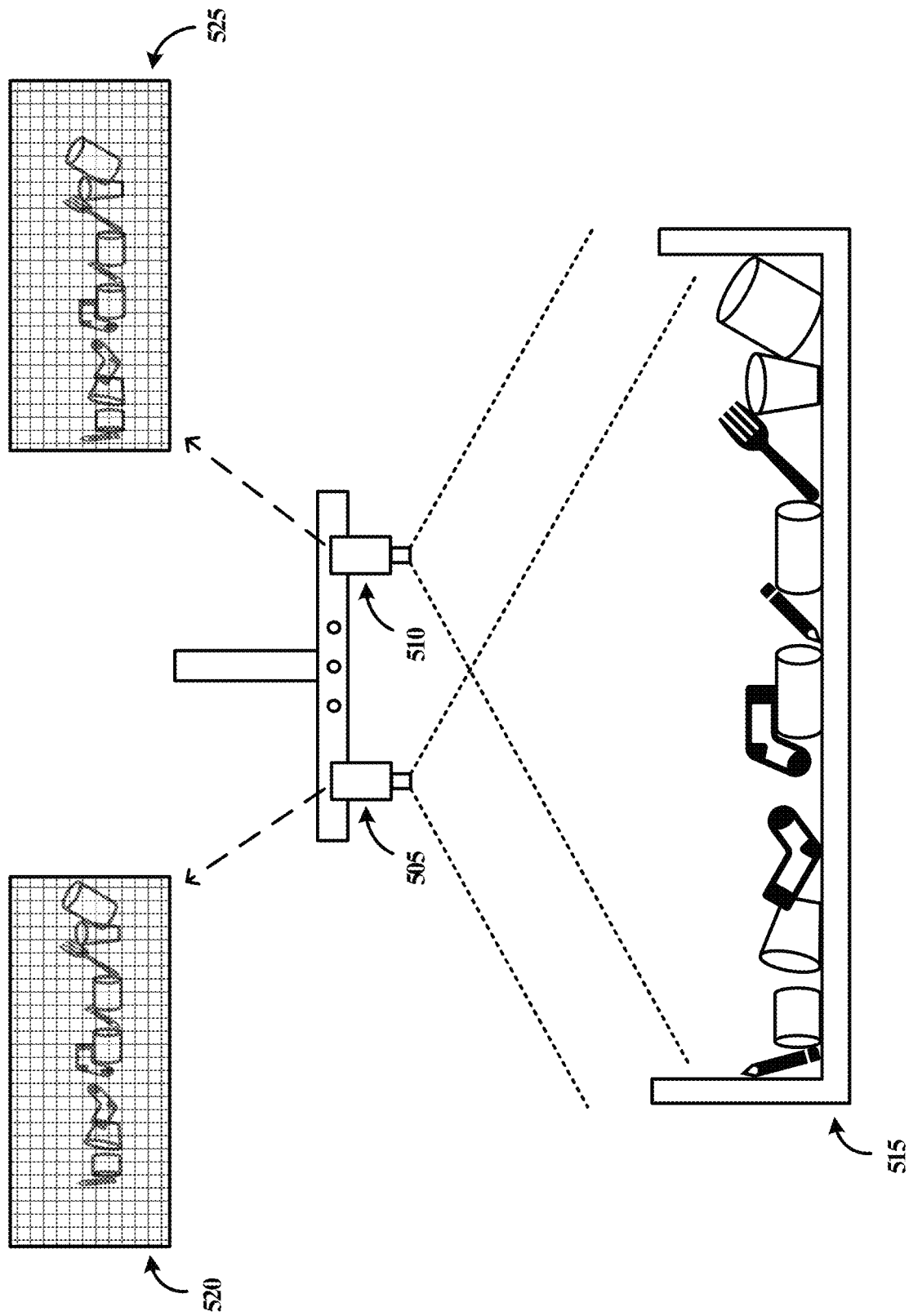
FIG. 5 illustrates an example of how two cameras may be used to create images used to perceive depth for a set of items in a bin in accordance with some embodiments of the present technology.

FIG. 5 illustrates an imaging technique in accordance with some embodiments of the present technology. The present example includes camera 505, camera 510, bin 515, image 520, and image 525. In the present example, two digital red-green-blue (RGB) cameras are mounted a fixed distance apart and used to determine depth. In order to determine depth, an image of bin 515 is taken with each of the cameras, camera 505 and camera 510. Camera 505 produces image 520 and camera 510 produces image 525. The two images are then overlaid using a deep neural net (DNN) depth model. Once the DNN has been trained to determine depth, it is able to find most or all of the matching pixels (i.e., "correspondences") between the two images based on training data. In another, more traditional method, triangulation can be used to find a depth value for each pixel based on the distances between pixels, the known distance between camera 505 and camera 510, and the known intrinsic parameters which describe the optical geometry of the cameras.

Training data may be used to teach the DNN how to determine depth, even in difficult scenarios such as reflective materials, translucent materials, low-texture materials, repeated patterns, solid colors, and similar challenging situations. After training the DNN to determine depth based on the images, depth can be accurately perceived using only the two RGB cameras, camera 505 and camera 510. Although the present example uses two RGB cameras, other types of cameras or a different number of cameras may be used to achieve the same results, and variations of the present example are anticipated.

Furthermore, the computer-vision system shown in FIG. 5 can be used for purposes in addition to depth perception and 3D mapping. The computer-vision system may be used and trained to estimate material properties, 3D bounding boxes, and many other types of information relevant to various picking or perturbation tasks.

Figure 6:
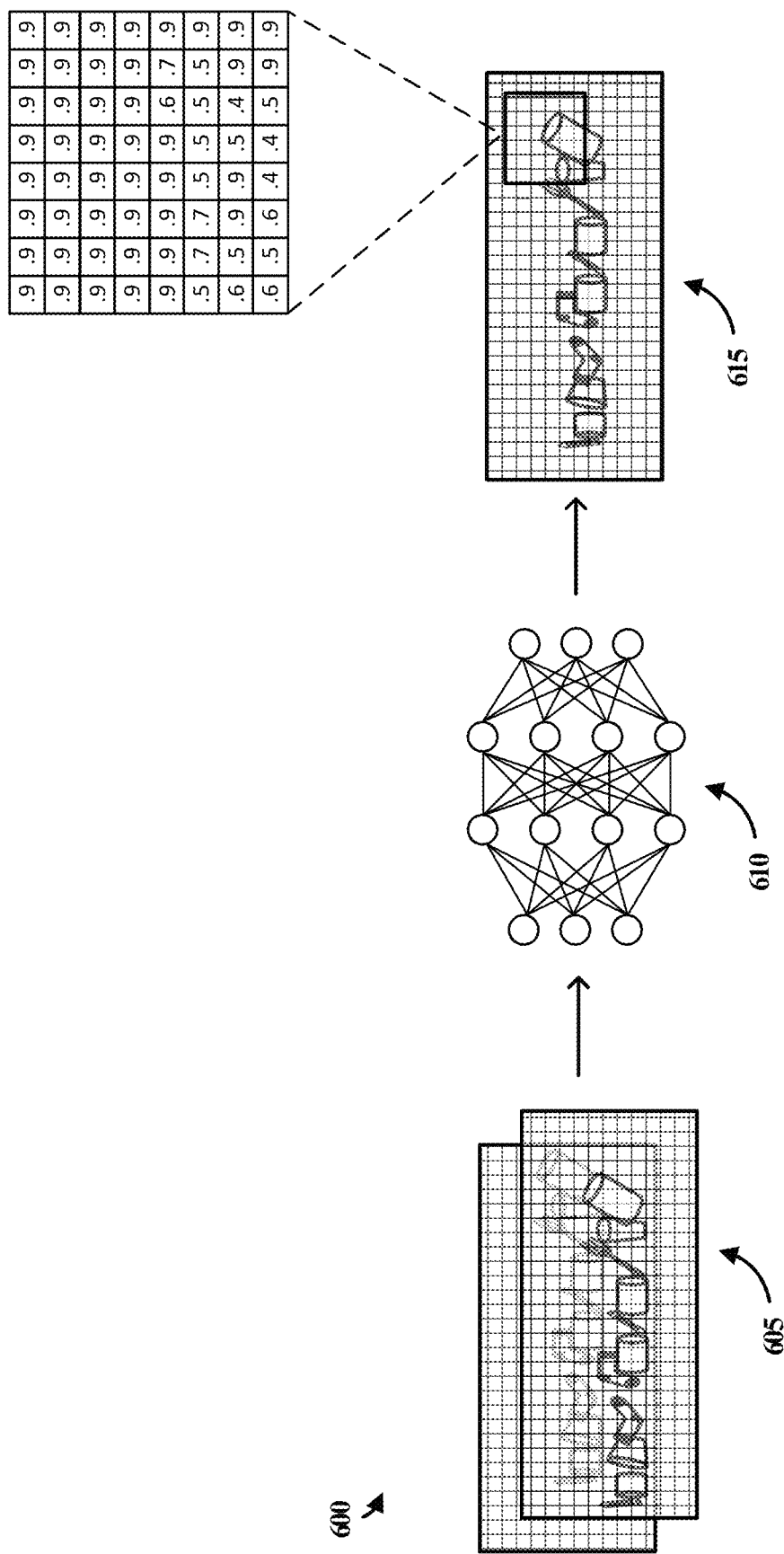
FIG. 6 illustrates an example of how a set of two-dimensional images are used to produce a single depth map via an artificial neural network in accordance with some embodiments of the present technology.

FIG. 6 illustrates example flow 600 in which the images produced by two RGB cameras are used to generate a depth map of a single image in accordance with some embodiments of the present technology. Images 605 may be the images produced in the example of FIG. 5 or may be an alternative set of images. Images 605 are used as inputs to DNN 610. In some examples, entire images may be used as inputs to DNN 610, while in other examples, groups of pixels from the images or super-pixels may be used as inputs to DNN 610. In some embodiments DNN 610 is a convolutional neural network. DNN 610 may represent more than one neural network in certain embodiments. Image 615 is produced as an output of DNN 610. After being output by DNN 610, image 615 provides a depth value for each pixel in the image, as illustrated in FIG. 6. Image 615 may be a full, rendered image or a smaller portion of the original images related to the inputted group of pixels. The depth value, in some examples, is the distance of the item in a given pixel from the cameras. The depth map shown in the present example is solely for the purposes of explanation. Actual depth maps and images may contain many more pixels than can be illustrated in the present example.

In order for a DNN to operate as described in the imaging examples above, DNN training includes a method for training a DNN such that it learns to use two RGB images to produce a depth map. Seeing depth is an important factor in image analysis processes such as segmentation, deciphering item geometries, or controlling a robotic arm. In order to train a DNN to produce a depth map in the manner described herein, the DNN may be trained on ground-truth labeled data such that it can learn how to identify depth. After the DNN is trained on ground-truth labeled data, it can use RGB cameras alone to determine depth as described in previous examples.

Figure 7:
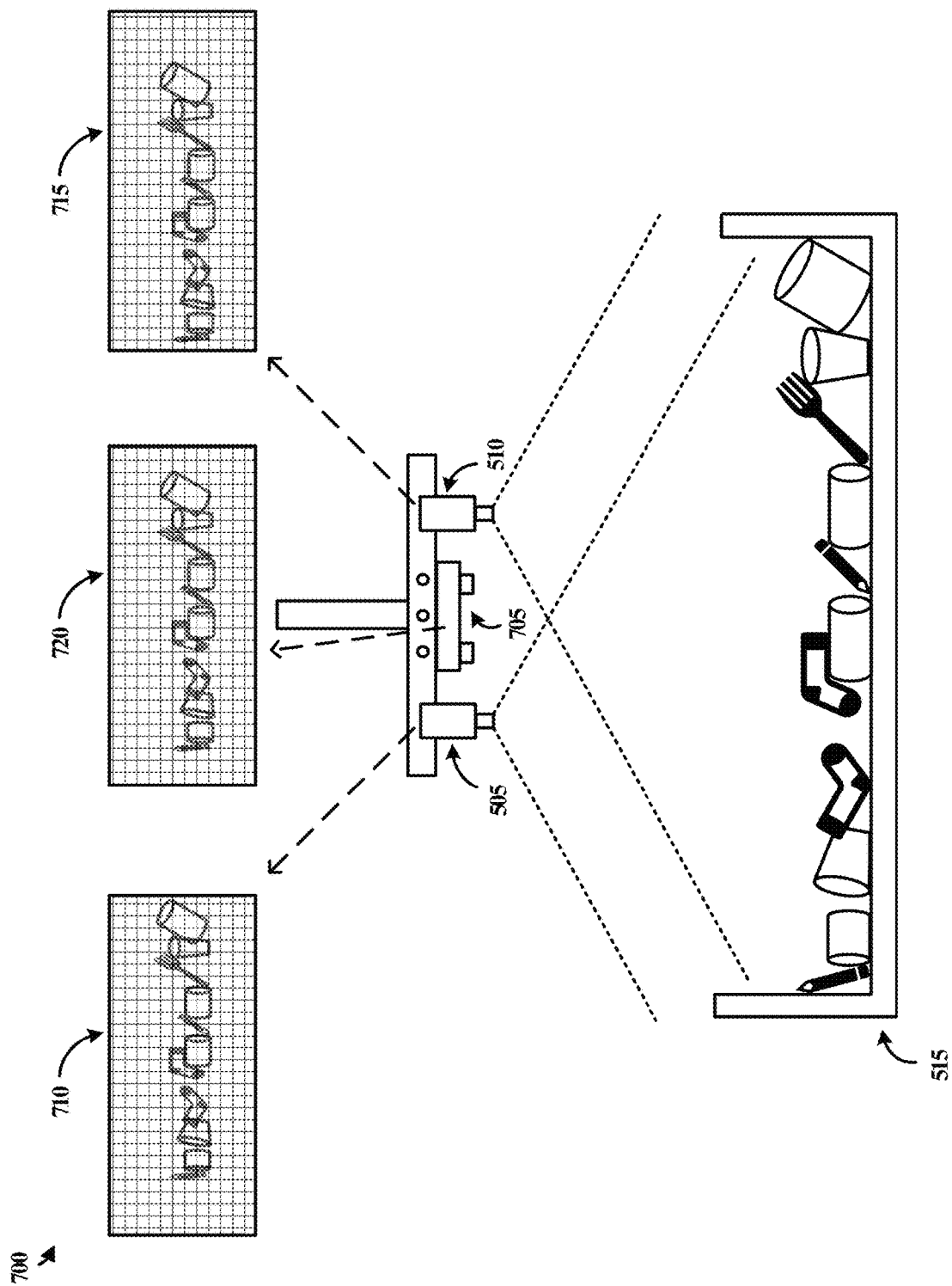
FIG. 7 illustrates an example of a training environment for learning to perceive depth in accordance with some embodiments of the present technology.

FIG. 7 illustrates training environment 700 in which a DNN is trained for the purposes of seeing depth in accordance with certain embodiments of the present technology. Training environment 700 includes camera 505, camera 510, bin 515, 3D camera 705, image 710, image 715, and 3D image 720. In the present example, 3D camera 705 produces images used to train a DNN. Training may include any number of training sets, ranging from less than ten to many thousands. 3D image 720 provides a training depth map to use for reference in images 710 and 715. Therefore, after training, the DNN can create a depth map from the two RGB images alone. In some examples, 3D camera 705 may project a known pattern onto a region, such as in bin 515, in order to determine depth. 3D camera 705 takes a 3D image of the region and the pattern to produce 3D image 720. 3D image 720 may be a 3D scan or similar type of image comprising 3D data. Other 3D imaging techniques may be used to achieve the resulting 3D image. Using 3D image 720 as a reference, DNN can learn to use image 710 and image 715 together to decipher depth. 3D image 720 calibrates the DNN such that for each pixel that initially has an RGB value, a depth value can be produced, either alongside or in replacement of the RGB value.

In many scenarios, a DNN may be sufficiently trained using just the 3D camera and the RGB cameras to image a variety of scenarios or items. However, some scenarios may be more challenging such as in cases of reflectivity, translucency, low-texture, patterns, and solid colors. Thus, other steps may be necessary to train the DNN for these more difficult scenarios. 3D camera 705 may be used to train the DNN to understand depth based on the RGB images in these scenarios using ground-truth labeled data. For example, to train for translucency, a clear water bottle may be imaged using the training set-up shown in FIG. 7. However, the original results of this imaging process may be incorrect because 3D camera 705 cannot accurately determine a distance to the translucent bottle. Thus, an additional training image may be used in which, without disrupting the current arrangement of items in the image, a coating is used on top of the translucent bottle. The coating may be any thin, non-disruptive layer that makes it easier for 3D camera 705 to determine depth. Examples of the coating include but are not limited to a thin powder, spray paint, an alternative type of spray coating, or an alternative type of paint. The coating allows for a second training image to be taken that has the same 3D geometry but with an improved surface for 3D perception.

After the additional training image is taken with which 3D camera 705 can accurately determine depth, the image can be used to train the DNN to determine depth in similar scenarios based on the two RGB images alone. In the present example, the second 3D image (i.e., the image with the coated bottle) contains the ground-truth data. Using the ground-truth data, the DNN can determine correspondences and use those to learn when two pixels of the RGB images are the same, even if they may look different. This process may be repeated any number of times while training the DNN with 3D camera 705. The same type of training can be formed to learn to decipher depth on images with reflective surfaces, translucent surfaces, low-texture surfaces, repeated patterns, solid colors, and other difficult scenarios. As previously discussed, any number of training sets may be used ranging from less than ten to upwards of thousands.

An alternative method for training a DNN to decipher depth may use computer simulation. Similar to the method described with reference to FIG. 7, 3D simulation can be used to train depth in a DNN based on non-3D images, such as images 520 and 525. In a simulation data set, the ground truth data is already known, because everything in the simulated environment has been virtually rendered. Thus, objects can be created in the simulated environment with a perfectly accurate depth map automatically available. Using the simulated environment, a DNN may be trained to perceive depth based on the known ground-truth labeled data. The simulated environment provides many opportunities for training in various situations, multiple views, and performing many training sets at a much faster rate than training with real, physical data sets, such as described in reference to FIG. 7.

Deep neural networks, such as those used in the picking, perturbation, segmentation, ranking, and depth perception models described herein, are used to learn mapping functions from inputs to outputs. Generating mapping functions is done through DNN training processes. Many various types of training and machine learning methods presently exist and are commonly used including supervised learning, unsupervised learning, reinforcement learning, imitation learning, and many more. During training, the weights in a DNN are continually updated in response to errors, failures, or mistakes. In order to create a robust, working model, training data is used to initially dial in the weights until a sufficiently strong model is found or the learning process gets stuck and is forced to stop. In some implementations, the weights may continue to update throughout use, even after the training period is over, while in other implementations, they may not be allowed to update after the training period.

Training neural networks, in some scenarios, may be the most difficult part of using artificial neural networks. Parameters of a neural network are found using optimization with many, or sometimes infinite, possible solutions. Modern deep learning models, especially for computer vision and image processing, are based on convolutional neural networks, although may also incorporate other deep generative models. As described herein, using artificial neural networks for the picking, perturbation, segmentation, ranking, and computer-vision processes first requires a training process. Most training processes are complex and require a great amount of time. A variety of different training methods may be used to train a robotic arm for intelligently picking and perturbing items in a bin are in accordance with the present disclosure.

Figure 8:
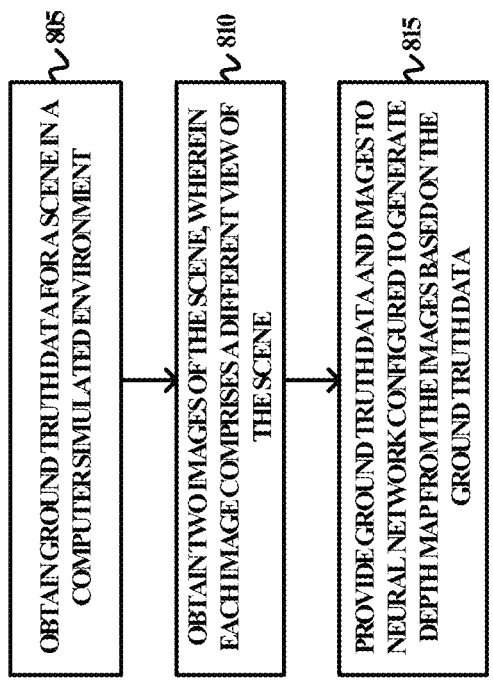
FIG. 8 is a flow chart illustrating an exemplary series of operations for training a computer vision system in accordance with some embodiments of the present technology.

FIG. 8 illustrates a process for training an artificial neural network to determine depth in a set of images without the need for three-dimensional cameras or the like. In some examples, the artificial neural network is a convolutional neural network. In step 805, the system obtains ground truth data for a scene in a computer simulated environment. The ground truth data may include depth information for the scene. In some examples, the scene may include one or more simulated objects for which depth information is included in the ground truth data. In step 810, the system obtains at least two images of the scene, wherein each image comprises a different view of the scene. In some implementations, each of the at least two images is meant to simulate images taken by two cameras at different locations. This scenario represents what the trained neural network may be used for external to the simulation.

In step 815, the system provides the ground truth data and the images as input to the neural network. The neural network, in training, is configured to generate a depth map from the images based on the ground truth data. To generate the depth map, the neural network may run recursively while continually updating the weights until an accurate depth map is produced in comparison to the ground truth data. The steps shown in FIG. 8 represent the steps for a single training set during training. However, these steps may be repeated for many more training sets that are provided to the neural network during training.

The processes described herein may be implemented in several different variations of media including software, hardware, firmware, and variations or combinations thereof. For example, neural net training methods described herein may be implemented in software, while a trained neural net for the picking and perturbation of items may be implemented entirely in hardware and installed in a robotic device. Alternatively, the robotic device may be controlled by a trained neural net implemented entirely in software on an external computing system, or may be implemented as a combination of the two across one or more devices. Similarly, the computer-vision and robotic control systems herein may be implemented on various types of components including entirely software-based implementations, entirely hardware-based aspects, such as trained computer-vision systems, or variations and combinations thereof.

FIG. 9 illustrates computing system 905 that is representative of any system or collection of systems in which the various processes, programs, services, and scenarios disclosed herein may be implemented. Examples of computing system 905 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 905 may be implemented as a single apparatus, system, or device or may be implemented in a distributed manner as multiple apparatuses, systems, or devices. Computing system 905 may include, but is not limited to, storage system 910, software 915, communication interface system 920, processing system 925, and user interface system 930. Components of computing system 905 may be optional or excluded in certain implementations. Processing system 925 is operatively coupled with storage system 910, communication interface system 920, and user interface system 930, in the present example.

Processing system 925 loads and executes software 915 from storage system 910. Software 915 includes and implements various processes described herein, which is representative of the processes discussed with respect to the preceding Figures. When executed by processing system 925, software 915 directs processing system 925 to operate as described herein for at least the various processes, operational scenarios, and sequences discussed in the foregoing implementations. Computing system 905 may optionally include additional devices, features, or functionality not discussed for purposes of brevity.

Referring still to FIG. 9, processing system 925 may comprise a micro-processor and other circuitry that retrieves and executes software 915 from storage system 910. Processing system 925 may be implemented within a single processing device but may also be distributed across multiple processing devices or sub-systems that cooperate in executing program instructions. Examples of processing system 925 include general purpose central processing units, graphical processing units, application specific processors, and logic devices, as well as any other type of processing device, combinations, or variations thereof.

Storage system 910 may comprise any computer readable storage media readable by processing system 925 and capable of storing software 915. Storage system 910 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 910 may also include computer readable communication media over which at least some of software 915 may be communicated internally or externally. Storage system 910 may be implemented as a single storage device but may also be implemented across multiple storage devices or sub-systems co-located or distributed relative to each other. Storage system 910 may comprise additional elements, such as a controller, capable of communicating with processing system 925 or possibly other systems.

Software 915 may be implemented in program instructions and among other functions may, when executed by processing system 925, direct processing system 925 to operate as described with respect to the various operational scenarios, sequences, and processes illustrated herein. For example, software 915 may include program instructions for implementing a robot control process, computer-vision process, decision making process, segmentation process, ranking process, or any other reasoning or operational processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 915 may include additional processes, programs, or components, such as operating system software, robotic control software, virtualization software, or other application software. Software 915 may also comprise firmware or some other form of machine-readable processing instructions executable by processing system 925.

In general, software 915 may, when loaded into processing system 925 and executed, transform a suitable apparatus, system, or device (of which computing system 905 is representative) overall from a general-purpose computing system into a special-purpose computing system customized for one or more of the various operations or processes described herein. Indeed, encoding software 915 on storage system 910 may transform the physical structure of storage system 910. The specific transformation of the physical structure may depend on various factors in different implementations of this description. Examples of such factors may include, but are not limited to, the technology used to implement the storage media of storage system 910 and whether the computer-storage media are characterized as primary or secondary storage, as well as other factors.

For example, if the computer readable storage media are implemented as semiconductor-based memory, software 915 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 920 may include communication connections and devices that allow for communication with other computing systems (not shown) over communication networks or connections (not shown). Examples of connections and devices that together allow for inter-system communication may include network interface cards, antennas, power amplifiers, radio-frequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 905 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of training an artificial neural network to determine depth in images using computer simulation, the method comprising:
   obtaining ground truth data for a scene in a computer simulated environment, wherein the ground truth data includes depth information for the scene;
   obtaining at least two images of the scene, wherein each of the at least two images is a two-dimensional image and comprises a different view of the scene; and
   providing the ground truth data for the scene and the at least two images of the scene as input to the artificial neural network, wherein the artificial neural network is configured to:
      identify which pixels in a first image of the at least two images correspond to pixels in a second image of the at least two images;
      generate a depth map from the at least two images based on the ground truth data; and
      output the depth map.

2. The method of claim 1, wherein the computer simulated environment comprises at least one simulated object for which the ground truth data includes depth information.

3. The method of claim 1, wherein each of the at least two images is captured by a different camera of at least two cameras of a computer-vision system associated with a robotic picking and placing environment.

4. The method of claim 1, wherein to generate the depth map from the at least two images, the artificial neural network recursively updates parameters within the artificial neural network until a generated depth map matches the depth information in the ground truth data.

5. The method of claim 1, further comprising generating the computer simulated environment.

6. The method of claim 1, wherein the artificial neural network is a convolutional neural network.

7. A computing apparatus comprising:
   one or more computer-readable storage media;
   a processing system operatively coupled to the one or more computer-readable storage media; and
   program instructions, stored on the one or more computer-readable storage media, for training an artificial neural network, wherein the program instructions, when read and executed by the processing system, direct the processing system to:
      obtain ground truth data for a scene, wherein the ground truth data includes depth information for the scene;
      obtain at least two images of the scene, wherein each of the at least two images is a two-dimensional image and comprises a different view of the scene; and
      provide the ground truth data for the scene and the at least two images of the scene as input to the artificial neural network, wherein the artificial neural network is configured to:
         identify which pixels in a first image of the at least two images correspond to pixels in a second image of the at least two images;

generate a depth map from the at least two images based on the ground truth data; and
output the depth map.

8. The computing apparatus of claim 7, wherein the scene is a scene in a computer simulated environment that comprises at least one simulated object for which the ground truth data includes depth information.

9. The computing apparatus of claim 8, wherein the program instructions further direct the processing system to generate the computer simulated environment.

10. The computing apparatus of claim 7, wherein each of the at least two images is captured by a different camera of at least two cameras of a computer-vision system associated with a robotic picking and placing environment.

11. The computing apparatus of claim 7, wherein to generate the depth map from the at least two images, the artificial neural network updates parameters within the artificial neural network until a generated depth map matches the depth information in the ground truth data.

12. The computing apparatus of claim 7, wherein the artificial neural network is a convolutional neural network.

13. A method of operating a computer vision system, the method comprising:
collecting a first two-dimensional image of a region with a first camera;
collecting a second two-dimensional image of the region with a second camera, wherein the second camera is at a different location from the first camera; and
providing the first two-dimensional image and the second two-dimensional image as input to an artificial neural network, wherein the artificial neural network is trained to:
identify which pixels in the first two-dimensional image correspond to pixels in the second two-dimensional image;
generate a depth map of the region based on the first two-dimensional image and the second two-dimensional image; and
output the depth map.

14. The method of claim 13, further comprising training the artificial neural network, wherein training the artificial neural network comprises:
obtaining ground truth data for a scene, wherein the ground truth data includes depth information for the scene;
obtaining at least two training images of the scene, wherein each of the at least two training images comprises a different view of the scene; and
providing the ground truth data for the scene and the at least two training images of the scene to the artificial neural network, wherein the artificial neural network:
generates a depth map from the at least two training images based on the ground truth data by recursively updating parameters within the artificial neural network until the depth map matches the depth information for the scene in the ground truth data; and
outputs the depth map.

15. The method of claim 14, wherein the scene is a scene in a computer simulated environment.

16. The method of claim 14, wherein obtaining ground truth data comprises collecting at least one three-dimensional image using a three-dimensional camera.

17. The method of claim 13, wherein the first camera is a red-green-blue (RGB) camera and the second camera is an RGB camera.

* * * * *